United States Patent [19]

Kestian et al.

[11] 4,356,878
[45] Nov. 2, 1982

[54] ARTICULATED TRACTOR POWER TRAIN

[75] Inventors: Anthony M. Kestian, Highland, Mich.; Raymond J. Allori, Chicago, Ill.

[73] Assignee: International Harvester Co., Chicago, Ill. ; by said Raymond J. Allori

[21] Appl. No.: 114,177

[22] Filed: Jan. 22, 1980

[51] Int. Cl.³ .............................................. B60K 17/34
[52] U.S. Cl. ................................ 180/235; 180/70 MS
[58] Field of Search ................ 180/70 MS, 70 R, 234, 180/235

[56] References Cited

U.S. PATENT DOCUMENTS

| | | | |
|---|---|---|---|
| 1,957,917 | 5/1934 | Storey | 180/235 |
| 3,191,709 | 6/1965 | Symons | 180/235 |
| 3,270,829 | 9/1966 | Steiger et al. | 180/235 |
| 4,019,598 | 4/1977 | Fresmann | 180/235 |

Primary Examiner—John A. Pekar
Attorney, Agent, or Firm—John W. Gaines; F. D. AuBuchon

[57] ABSTRACT

An improvement in an articulated tractor which has front and rear sections pivotally connected along a vertical axis of articulation. Each of the sections is supported by a pair of ground engaging wheels that are drivingly connected to a differential input by a differential and an axle. The improvement includes an engine mounted on the front section forward of the front section differential with the engine's output element disposed longitudinally of the tractor. The engine's output element extends rearwardly toward the front section differential and is vertically positioned in close proximity to the top of the front section differential. The improvement also includes a power train connected to the engine's output element which provides for the transmittal of engine power rearwardly from the engine output element along a first path over the front section differential, to and through the axis of articulation. The first path terminates rearward of the axis of articulation where the power is split between a second path and a third path. The second path continues rearwardly, and transmits its portion of the engine power to the rear section differential input. The third path initially transmits power in a loop outwardly, downwardly, forwardly and inwardly to the axis of articulation, where it is positioned below the first path. The third path continues forwardly, and transmits its portion of the engine power to the front section differential input.

7 Claims, 5 Drawing Figures

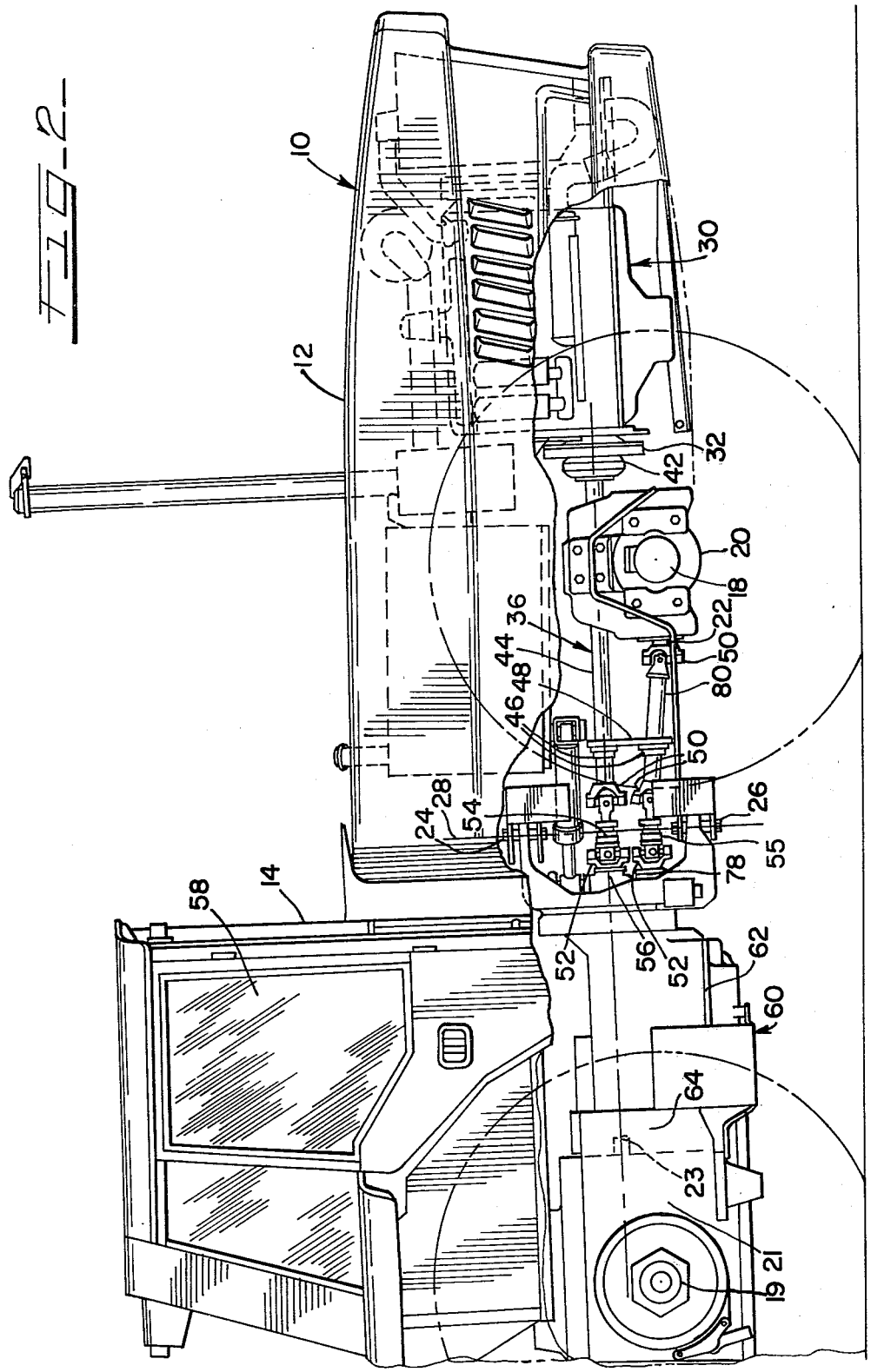

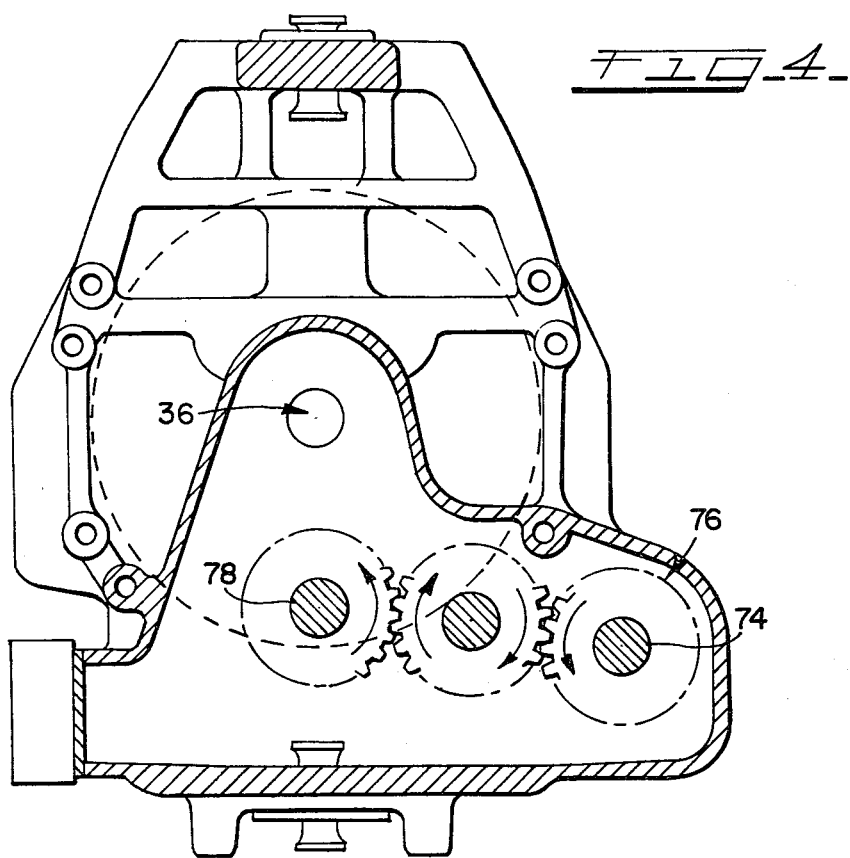
FIG_4_
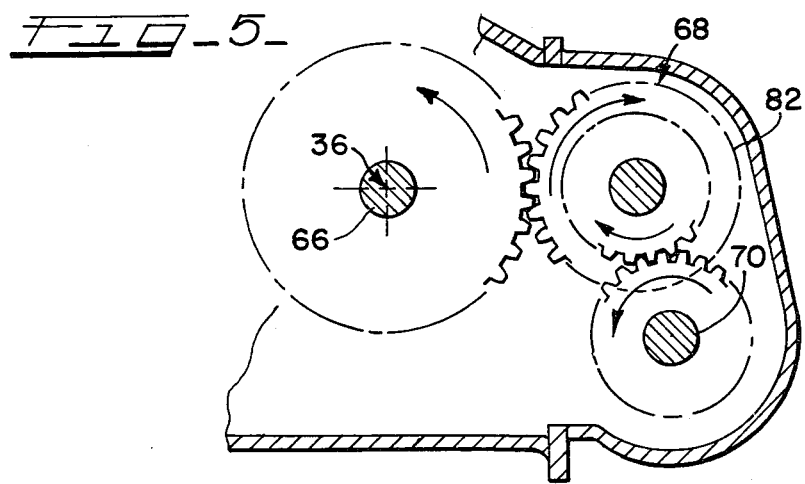
FIG_5_

ARTICULATED TRACTOR POWER TRAIN

BACKGROUND OF THE INVENTION

This invention relates generally to articulated tractors and more particularly concerns four-wheel-drive articulated tractors.

The trend in today's agricultural industry is to maximize the efficiency of each crop producing unit by increasing the size of the units. The larger units minimize the manual labor involved by making it possible to effectively utilize the larger horsepower tractors and their associated implements. As the available horsepower of a tractor increases, it becomes more economical and efficient to design, build and use a tractor that is articulated.

Although an articulated tractor is preferable, the size of the engine and the related power train for the high horsepower tractors has traditionally produced a high profile for the tractor. The high profile restricts the operator's visibility from the articulated tractor which has been a major factor in the elimination of these tractors from use in the planting, growing and harvesting of row crops such as corn, soy beans, and sun flowers.

For many years there has been extensive work down in the area of articulated tractor designs as exemplified by U.S. Pat. Nos. 1,957,917, 3,270,829 and 4,019,598. A study of these patents will show that the operator's visibility from the driver seat would severely limit his ability to maintain the tractor wheels in the spacing between the rows required by such crops. These patents clearly show that the engines and their related power trains are the causative factors in the high profile of the high horsepower articulated tractors.

The '598 and '829 patents are also exemplary of the extreme complexity of the drive trains of four-wheel-drive articulated tractors. The addition of the four-wheel-drive feature in an articulated tractor is designed to take full advantage of the high horsepower of the tractor's engine by maximizing the tractive effort of the tractor. Although the four-wheel-drive feature accomplishes its desired goal, these patents clearly show that it also contributes to the high profile of the tractor.

Accordingly, it is an object of the present invention to materially reduce if not substantially eliminate this particular visibility problem by providing an engine location and power train arrangement that minimizes their vertical space requirement.

Moreover, it is an object of the present invention to provide such a tractor with a power train that can maximize the tractor's tractive effort by utilizing a four-wheel-drive system.

SUMMARY OF THE INVENTION

An improvement in an articulated tractor which has front and rear sections pivotally connected along a vertical axis of articulation is provided. Each of the sections is supported by a pair of ground engaging wheels that are drivingly connected to a differential input by a differential and an axle. The improvement includes an engine mounted on the front section forward of the front section differential with the engine's output element disposed longitudinally of the tractor. The engines output element extends rearwardly toward the front section differential and is vertically positioned in close proximity to the top of the front section differential. The improvement also includes a power train connected to the engine's output element which provides for the transmittal of engine power rearwardly from the engine output element along a first power path over the front differential, to and through the axis of articulation. The first path terminates rearward of the axis of articulation where the power is split between a second power path and a third power path. The second path continues rearwardly, and transmits its portion of the engine power to the rear section differential input. The third path initially transmits power in a loop outwardly, downwardly, forwardly and inwardly to the axis of articulation, where it is positioned below the first path. The third path continues forwardly and transmits its portion of the engine power to the front section differential input.

BRIEF DESCRIPTION OF THE DRAWINGS

Other objects and advantages of the invention will become apparent upon reading the following detailed description and upon reference to the drawings, in which:

FIG. 2 is a right side view of the vehicle of FIG. 1 showing the preferred embodiment location of the elements of the present invention;

FIG. 4 is a sectional view taken on line 4—4 of FIG. 3; and

FIG. 5 is a sectional view taken along line 5—5 of FIG. 3.

While the invention will be described in conjunction with a preferred embodiment, it will be understood that this specification is not intended to limit the invention to that embodiment. On the contrary, this disclosure is intended to cover all alternatives, modifications and equivalents as may be included within the spirit and scope of the invention as defined by the appended claims.

DETAILED DESCRIPTION OF THE INVENTION

Figure 1:
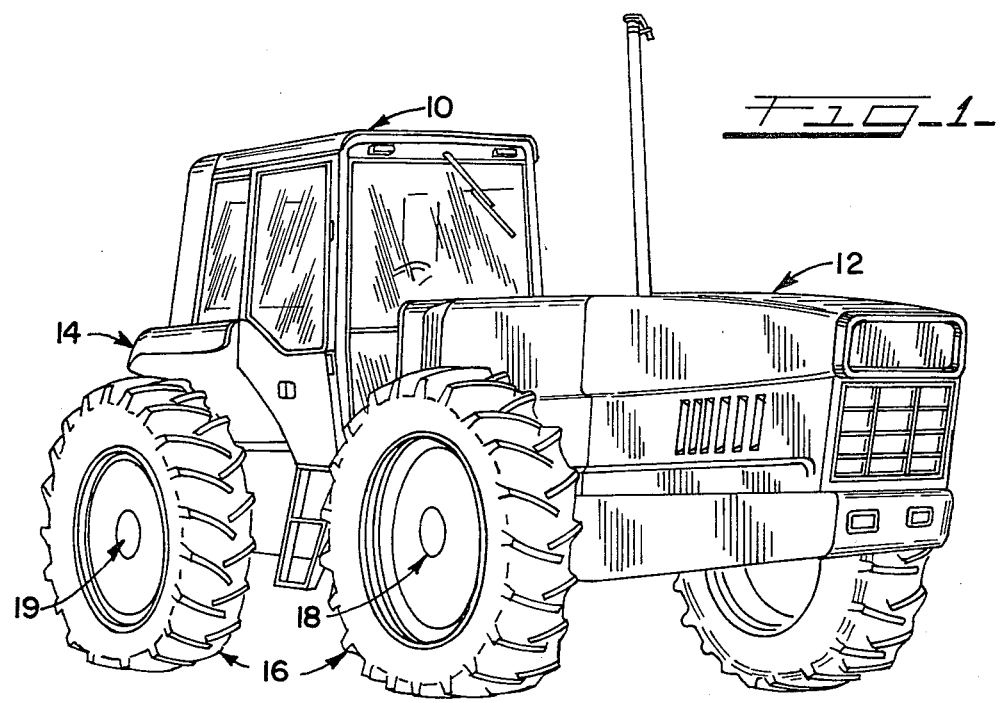
FIG. 1 is a right front perspective view of a tractor incorporating the present invention.

Turning first to FIG. 1, there is shown an articulated tractor generally 10. The tractor includes a front section generally 12 and a rear section generally 14 which are both supported by pairs of ground engaging wheels generally 16. In the preferred embodiment, all four wheels 16 receive power from the engine via front and rear axles generally 18 and 19, respectively.

Figure 3:
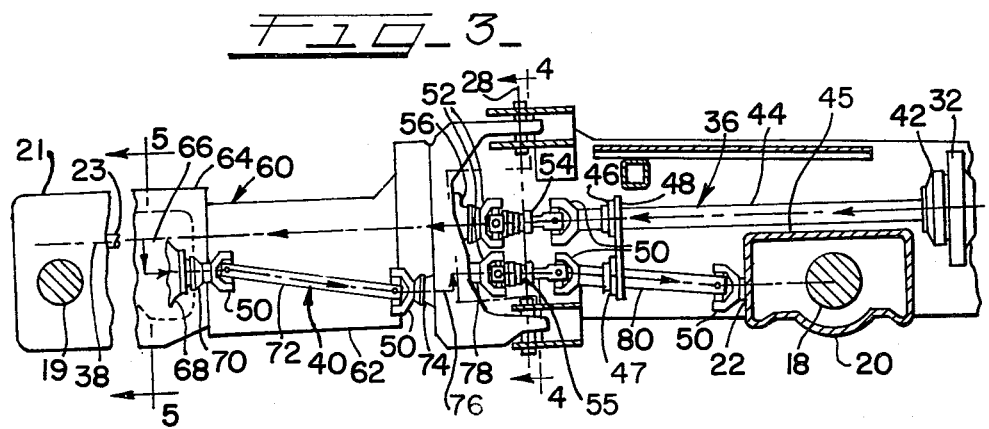
FIG. 3 is a right side view of the power train of the present invention.

Turning now to FIGS. 2 and 3, it will be seen that the front 18 and rear 19 axles of the tractor are in turn driven by differentials 20 and 21, respectively, which receive their power through their respective inputs 22 and 23. Since the rear differential is part of a conventional but yet complicated final drive for a tractor, the differential and its input are schematically depicted in the drawing figures.

Returning to FIG. 2, it will be seen that the front section 12 and the rear section 14 of the articulated tractor generally 10 are pivotally connected at first and second hinge points 24 and 26 respectively along the axis of articulation 28 of the tractor generally 10. FIG. 2 also shows the engine generally 30 mounted in the front section 12 of the tractor generally 10. The engine generally 30 is positioned forward of the front differential 20 and has its output element, a fly wheel 32, longitudinal to the tractor and extending rearwardly from the engine 30.

In carrying out the present invention a power train is provided to transmit the engine power from its output element 32 to both the front axle 18 and the rear axle 19. Turning first to FIG. 3, the power train 34 is shown to include a horizontal first power path generally 36, a horizontal second power path 38 and a looping third power path generally 40. In the preferred embodiment the first power path generally 36 is connected to the engine output element 32 by a dampener 42, e.g. Lord Kinematics' Dynaflex Coupling #LCD-0200-18-A or an equivalent. The dampener 42 is designed to absorb the vibrations which are present in a power train that transmits large quantities of power through a long power train.

The dampener 42 is connected to a first drive shaft 44 which is in close proximity to the top 45 of the front section differential 20. The first drive shaft 44 is supported by a bearing 46 as it passes through a bearing support plate 48, and is then connected to a simple universal joint 50 forward of the axis of articulation 28. The bearing support plate 48 is located on the front section of the tractor and has a pair of vertically aligned spaced apart apertures having bearings 46 and 47 for supporting the first drive shaft 44 and the front axle drive shaft 80. The U-joint 50 is connected to a slip type U-joint 52 by first intermediate shaft 54. The slip type universal joint 52 is positioned rearwardly of the axis of articulation and provides the sliding connection with the first intermediate shaft 54 that is necessary to allow for the variation of the distance between slip type U-joint 52 and simple U-joint 50 when the vehicle is articulated in a turn.

After passing through the axis of articulation, the first power path 36 continues rearwardly with the slip type U-joint 52 being connected to a clutch 56. The clutch 56 is controlled by the operator in the operator station 58 to selectively transmit or interrupt the transmission of power in the first power path 36. The first power path 36 continues through the clutch into the transmission generally 60 of the vehicle.

The transmission in the preferred embodiment includes a speed section 62 and a range section 64 which are controlled by the operator in his station 58 to select the speed at which the engine power is transmitted through the power train. The first power path 36 continues through the transmission and terminates at the output 66 of the range section 64 of the transmission generally 60. At this point in the power train the engine power is split and travels along the second power path 38 and the third power path 40. The second power path 38 continues rearwardly, and supplies its share of the engine power to the rear wheels of the tractor by supplying power to the rear differential input 23, which is disposed longitudinally of the tractor in the plane of the tractor's centerline.

The other portion of the engine power is transmitted outwardly and downwardly through a first gear set 68 in the third power path generally 40 (see FIG. 5). The output 70 of the first gear set generally 68 connected by a pair of simple U-joints 50 and an interconnecting shaft 72 to the input 74 of the second gear set 76 of the third path 40. When the engine power travels between the first gear set 68 and the second gear set 76 of the third path, it moves forwardly and downwardly as shown in FIG. 3.

The second gear set 76 of the third path 40 is shown in FIG. 4 to transmit the engine power substantially inwardly until it is immediately below the first power path 36. The third path 40 passes through the axis of articulation 28 below the first path 36 by connecting the output of its second gear set 76 to a slip-type U-joint 52, second intermediate 55 and a simple U-joint 50 substantially identical to those used in the first path generally 36 (see FIG. 3). The first 54 and second 55 intermediate shafts extend in a fore and aft direction and are vertically alligned in a spaced apart relationship such that the first 54 shaft is directly above the second shaft 55. The simple U-joint 50 of the third path 40 is connected to the front differential input 22 via a front axle drive shaft 80 which is supported by a bearing 47 as its passes through the front drive plate 48. The shaft 80 is then connected to the front differential input 22 by another simple U-joint 50. As shown in FIG. 3 after the third path generally 40 passes through the axis of articulation 28 it proceeds forwardly and then downwardly and forwardly until it is connected to the front differential input 22 which is disposed longitudinally of the tractor in the plane of the tractor's centerline. As can be seen in FIGS. 2 and 3 the first and third power paths are the sole power paths connecting the front and rear sections.

One of the features of the present invention is found in the multiple functions of the first generally 68 and second generally 76 gear sets of the third path generally 40 as shown in FIGS. 4 and 5. It will be seen that each of the gear sets 68 and 76 utilize three gears to establish the third path between the termination point 66 (i.e., the output of the range section of the transmission) of the first path 36 and the output 78 of the second gear set. This use of three gears allows maximum flexibility in the vertical and horizontal positioning of the interconnecting shaft 72, thereby insuring clearance between the transmission generally 60 and the inter-connecting shaft 72. The use of sets of three gears makes it possible insure this clearance while providing a uniform direction of rotation of the engine power being transmitted into both the front and rear differential inputs, thereby simplifying the design of the front and rear differentials respectively 20 and 21. The final function of the gear sets is found in the first gear set generally 68 which incorporates a compound intermediate gear 82. This gearing arrangement makes it possible to fine tune the speed of the power transmitted in the third path generally 40 to the precise speed requirements of the front differential 20, without requiring a complicated transfer case and without effecting the power being transmitted in the second path 38 to the rear differential 21.

An additional feature of the present invention lies in the fact that the first path generally 36 and the third path generally 40 are coplaner between the engine outward element 32 and the second gear set 76. This coplaner relationship is established by the front differential input 22, the engine output 32, the output 78 of the second gear set, the first path generally 36 and all their respective connecting shafts and U-joints being in the plane of the center line of the vehicle when the vehicle is not in a turning mode. The coplaner relationship between these portions of the first and third paths makes it possible to utilize two sets of the slip type universal joint and the simple universal joints with their connecting shafts to maximize the simplicity of the power path as they pass through the axis of articulation 28.

Thus it is apparent that there has been provided, in accordance with the invention, a power system for an articulated tractor that sets aside the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all those alternatives, modifications, and variations as followed in the spirit and broad scope of the appended claims.

What is claimed is:

1. In an articulated tractor having front and rear sections pivotally connected at a vertical axis of articulation, each of said sections supported by a pair of ground engaging wheels drivingly connected to a differential input through a front differential having a top surface and a rear differential and respective front and rear axles, the improvement comprising:
   an engine mounted on said front section of said articulated tractor forward of said front section differential;
   an engine output element mounted for rotation to said engine;
   a first gear set mounted on said rear section of said tractor;
   a first power path between said engine output element and said first gear set, said first power path comprising a first drive shaft extending rearwardly from said engine and in close proximity to said top surface of said front differential, a first intermediate shaft, a transmission having an interconnected speed section and a range section including an output of said range section, said first drive shaft connected by a universal joint connection to said intermediate shaft and said intermediate shaft connected by a slip type universal joint connection to the speed section of said transmission and the output of the range section of said transmission connected to said first gear set;
   a second power path from said first gear set to said rear differential, said second power path comprising a rear differential input connected between said first gear set and said rear differential;
   a third power path extending from said first gear set to said front differential, said third power path comprising an interconnecting shaft, a second gear set, a second intermediate shaft and front axle drive shaft, said interconnecting shaft having universal joint connections at each end thereof connecting said interconnecting shaft with said respective first and second gear sets, said second intermediate shaft connected by a slip type universal joint connection to said second gear set and a universal joint connection to said front axle drive shaft, said front axle drive shaft connected through a universal joint to said front differential;
   said first drive shaft located vertically above said front axle drive shaft.

2. The invention in accordance with claim 1 wherein said rear axle and wheel assembly of said articulated tractor is driven by said engine through said first and second power paths and said front axle and wheel assembly of said articulated tractor is driven by said engine through said first and third power paths.

3. The invention in accordance with claim 1 wherein said first intermediate shaft and said second intermediate shaft extend in a fore and aft direction and are vertically aligned in a spaced apart relationship, each of said shafts located on said vertical axis of articulation.

4. The invention in accordance with claim 1 wherein said first and said third power paths are the sole power paths connecting said front and said rear sections.

5. The invention in accordance with claim 1 wherein said transmission speed section and said transmission range section are carried in said rear section of said articulated tractor.

6. The invention in accordance with claim 1 wherein said first intermediate shaft and said second intermediate shaft are vertically aligned in a spaced apart relationship and are generally perpendicular to said axis of articulation in a fore and aft direction on said vertical axis of articulation.

7. The invention in accordance with claim 1 wherein said first drive shaft is supported in a bearing support plate located on said front section and said front axle drive shaft is supported in said bearing support plate, said bearing support plate utilizing a pair of vertically aligned spaced apart bearings to support said first drive shaft and said front axle drive shaft respectively.

* * * * *